United States Patent [19]

Weis et al.

[11] Patent Number: 4,597,301

[45] Date of Patent: Jul. 1, 1986

[54] POWER TAKEOFF SPEED CONTROL ASSEMBLY

[75] Inventors: Philip J. Weis, Sylvania, Ohio; Richard Cook, Gregory, Mich.; David C. Kaminski, Sylvania; James E. Smith, Toledo, both of Ohio

[73] Assignee: Dana Corporation, Toledo, Ohio

[21] Appl. No.: 595,512

[22] Filed: Mar. 30, 1984

[51] Int. Cl.[4] .............. F16H 3/700; F16D 23/00; F16D 43/22; F16D 67/00
[52] U.S. Cl. .................. 74/15.86; 74/15.8; 74/878; 192/0.033; 192/3.58
[58] Field of Search ............ 74/878, 15.86, 15.8, 74/15.63; 192/0.033, 3,58, 0.076; 123/198 D

[56] References Cited

U.S. PATENT DOCUMENTS

| | | | |
|---|---|---|---|
| 3,041,884 | 7/1962 | Elfes | 74/15.86 |
| 3,215,234 | 11/1965 | Hirano | 192/0.076 |
| 3,583,405 | 6/1971 | Gerhardt | 130/27 R |
| 3,619,680 | 11/1971 | Okamota | 310/168 |
| 3,623,059 | 11/1971 | Rickerd | 340/684 |
| 3,719,841 | 3/1973 | Ritsema | 310/155 |
| 4,132,132 | 1/1979 | Shaffer | 74/15.86 |
| 4,142,488 | 3/1979 | Steinecke et al. | 192/0.033 |
| 4,191,270 | 3/1980 | Monteith | 180/536 |
| 4,275,607 | 6/1981 | Snoy | 74/15.63 |
| 4,331,045 | 5/1982 | Piech et al. | 192/0.076 |
| 4,344,499 | 8/1982 | van der Lely et al. | 192/3.58 |
| 4,388,987 | 6/1983 | Hennessey et al. | 192/3.58 |
| 4,416,358 | 11/1983 | Kapp | 192/3.58 |
| 4,475,637 | 10/1984 | Oguma et al. | 192/0.076 |
| 4,479,399 | 10/1984 | Narvesor et al. | 192/3.58 |
| 4,510,899 | 4/1985 | Macy | 123/198 D |

FOREIGN PATENT DOCUMENTS 922159 3/1963 United Kingdom ............ 74/15.86
949878 2/1964 United Kingdom .

OTHER PUBLICATIONS

Red Lion Controls Brochure No. 701221C.
Installation Instructions-EOS100-Muncie Power Products.
Muncie Power Products Price List No. 407-20.
Switch Out Overspeed Automatically-Muncie Power Products.
Muncie Powershift PTO Complete Installation Kits.
Protect Your Power Equipment from Engine Overspeed Damage, EOS-100 Overspeed Switch.
Muncie Power Products, Inc., Clutch Pumps Brouchure, MP80-11.
Muncie Power Products, Mobile Power Equipment Brochure, MP82-04.

*Primary Examiner*—Kenneth J. Dorner
*Assistant Examiner*—Michael D. Bednarek
*Attorney, Agent, or Firm*—Emch, Schaffer, Schaub & Porcello Co.

[57] ABSTRACT

The present invention provides a speed control system for use in maintaining the rotational speed of an output shaft of a power takeoff unit within a predetermined range. A central control unit receives signals indicative of the speed of the input gear and, in response to the received signals engages and disengages the output shaft of the power takeoff unit. The central control unit also disengages the output shaft if the system's voltage levels drop below a preset minimum.

18 Claims, 5 Drawing Figures

POWER TAKEOFF SPEED CONTROL ASSEMBLY

This present invention relates to an improved power takeoff speed control assembly for use in most industrial and agricultural applications, where power takeoff units are employed, to operate various pieces of accessory mechanical tools using the power output of the engine of the primary vehicle. Such power takeoff units are commonly engaged with the engine of the vehicle through transfer cases or transmissions. As a result of such direct engagement, the speed of operation of the power takeoff unit is directly relative to the speed at which the engine is operating.

Field use of power takeoff assemblies commonly encounters undesirable results when the engine speed of the primary vehicle exceeds that speed at which a mechanical tool accessory can be safely employed. For instance, an overspeed condition at the power takeoff unit may imperil not only the mechanical integrity of the accessory tool but also the safety of the operator and in some cases, serious physical harm to the operator could result. Often the operator, when using the power takeoff unit and mechanical accessory, is in a location where the engine cutoff or power takeoff cutoff is inaccessible should an emergency arise. Therefore, a demand exists for a reliable sensing device which responds to engine overspeed conditions and acts to disengage the output shaft of a power takeoff unit, until the engine speed slows to a level where safe operation of the power takeoff unit and accessory tool is possible.

Other problems are encountered when cold starting an engine having a power takeoff assembly. If the driving voltage for the power takeoff unit and engine is inadequate, severe strain and possible damage to mechanical components can result if the power takeoff unit is engaged. Similarly, the operator is commonly in a physical location proximate the tool accessory during operation of the power takeoff unit making it difficult to determine if an undervoltage situation is occurring. Therefore, there is also need for a reliable sensor device which determines the voltage conditions of the engine drive system and power takeoff assembly and acts to disengage the power takeoff unit if an undesirable voltage condition arises.

The present invention provides a speed control system for use in maintaining the rotational speed, of an output shaft of a power takeoff unit, within a desired range. The power takeoff assembly of the present invention includes a central control unit which can be mounted within the cab of the primary vehicle. The central control unit is operatively connected to the power takeoff unit and receives electronic signals representative of the engine speed and, in response to the received signals, operates a valve which directs fluid under pressure to and from the power takeoff unit to engage or disengage the output shaft of the power takeoff unit. The control unit also includes a sensing circuit designed to maintain surveillance over the voltage levels of the drive vehicle circuits and the power takeoff unit. Should the voltage level drop below a required minimum, the control unit will command the valve means to disengage the power takeoff assembly.

The speed control system of the present invention also includes means to reset and re-engage the output shaft of the power takeoff unit once the system voltage has returned to normal or the engine speed has returned to a desirable range. The present invention further provides various other controls which are used to adjust the disengagement speed and the reset speed for the power takeoff unit. Indicator lights are provided on the central control unit to inform the operator if the power takeoff unit is in operation or if an overspeed condition exists at the power takeoff unit.

These features and various other features of objects of the present invention will be apparent from a consideration of the following detailed description, drawings, and claims.

The power takeoff assembly of the present invention includes a power takeoff unit 10 which is engaged with the engine of a primary vehicle, usually through the transmission 12 or transfer case (not shown) of the vehicle. The power takeoff unit includes an input gear 14 which is engaged with the transmission 12 for rotation.

Figure 3:
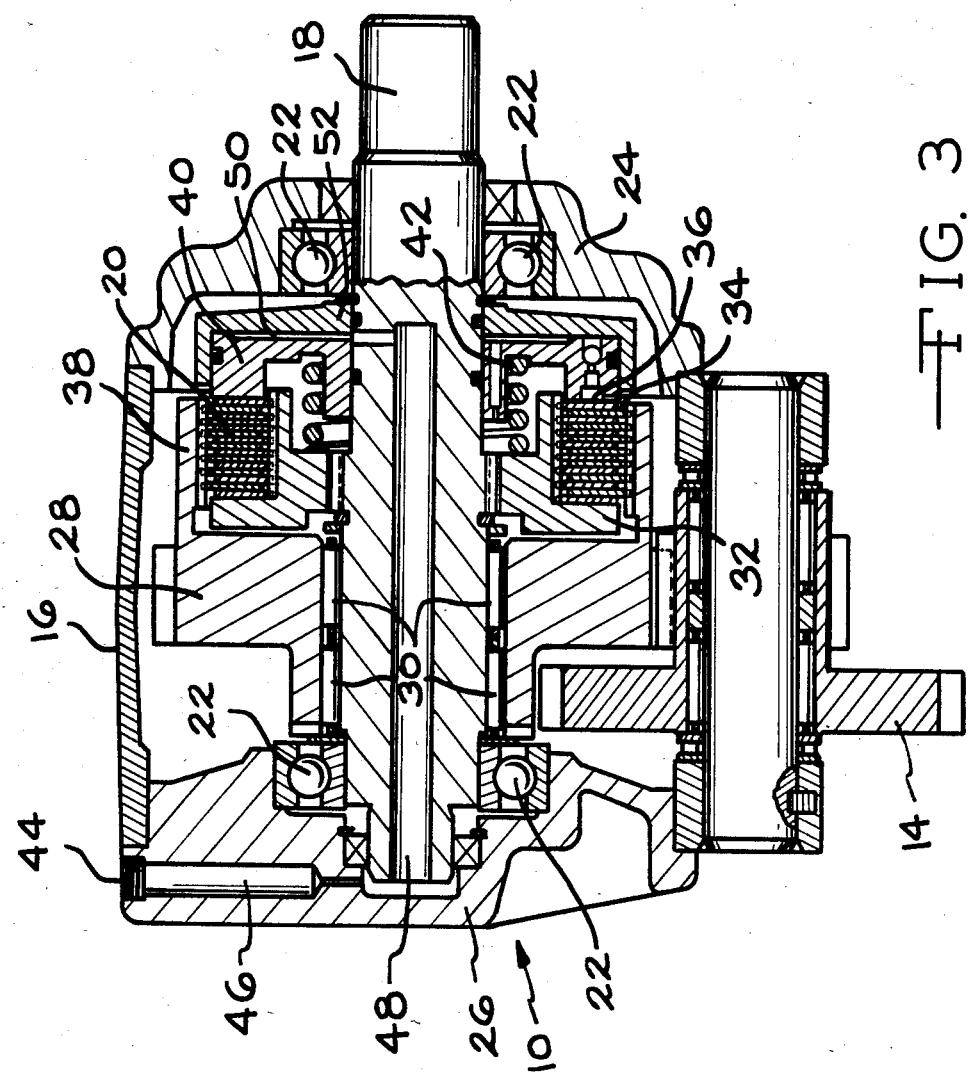
FIG. 3 is a cutaway view showing the structure of a power takeoff unit.

Referring now to FIG. 3, the power takeoff unit includes a housing 16 which engages an output shaft 18 and clutch pack 20. The output shaft 18 is journaled for rotation within the housing 16 by bearings 22 mounted in bearing covers 24, 26 which are fixed to the opposed ends of the housing 16. An output gear 28 is mounted around the ouput shaft 18 and rotates relative to the output shaft 18 by means of roller bearings 30. The output gear 28 engages the input gear 14 and is driven by the rotation of the input gear 14.

The output gear 28 engages the clutch pack 20 of the power takeoff unit 10. The clutch pack 20 includes a inner clutch gear 32 which is mounted on the output shaft 18 adjacent the output gear 28. The inner clutch gear 32 is engaged with the output shaft 18 and rotates with the output shaft 18. The inner clutch gear 32 is not directly engaged with the output gear 28. The clutch pack 20 further includes a plurality of friction discs 34 and clutch plates 36 which are positioned between the inner clutch gear 32 and a flange 38 of the output gear 28. The friction discs 34 and clutch plates 36 are alternatively positioned with respect to each other so that the friction discs 34 engage the flange 38 of the output gear 28 and the clutch plates 36 engage the inner clutch gear 32. Thus, the output gear 28 will become indirectly engaged with and drive the inner clutch gear 32 when the friction discs 34 and the clutch plates 36 are pressurized into engagement to rotate as one unit.

To facilitate pressurization of the friction discs 34 and clutch plates 36, the clutch pack 20 also includes a piston 40 and counterspring 42 mounted about the output shaft 18. In operation, the piston 40 is pressurized to engage and press against the friction discs 34 and clutch plates 36 combination to cause the friction discs 34 and clutch plates 36 to engage one another and rotate as an integral unit. This engagement between the friction discs 34 and the clutch plates 36 will likewise cause the inner clutch gear 32 to rotate with the output gear 28 and drive the output shaft 18 of the power takeoff unit 10.

The clutch pack 20 of the power takeoff unit 10 is designed to remain in a disengaged position during all periods of non use. This is accomplished through counterspring 42, which exerts a force against the piston 40 and removes the piston 40 from engagement with the friction discs 34 and clutch plates 36 combination. When the piston 40 is not engaged with the friction discs 34 and clutch plates 36, the discs 34 will be driven by the output gear 28 and will rotate with respect to the clutch plates 36 which are engaged with the inner clutch gear 32. No driving forces will be transmitted from the output gear 28 to the inner clutch gear 32. Under such conditions, the output shaft 18 remains stationary.

To operate the power takeoff unit 10, fluid is received under pressure through a fitting (not shown) mounted in the orifice 44 located in bearing cover 24, as shown in FIG. 3. The fluid under pressure flows through the orifice 44 and connecting passageway 46 into a second passageway 48 located within the output shaft 18. The fluid under pressure then flows into a pressure chamber 50 which exists between the piston 40 and a clutch pack casing unit 52. As the fluid under pressure flows into the pressure chamber 50, it exerts pressure against the face of the piston 40; the force of such pressure being sufficient to overcome the counterforces exerted by counterspring 42, thereby pressing the piston 40 into engagement with the friction discs 34 and clutch plates 36. As the friction discs 34 and clutch plates 36 engage, the output shaft 18 receives a driving force from the output gear 28 and begins to rotate. To disengage the output shaft 18 from the force of the output gear 28 and discontinue its rotation, the fluid under pressure is drained from the pressure chamber 50 through passageways 48 and 46, thereby releasing the pressure against the piston 40 and allowing the forces exerted by the counterspring 42 to disengage the piston 40 from the friction discs 34 and clutch plates 36.

Figure 1:
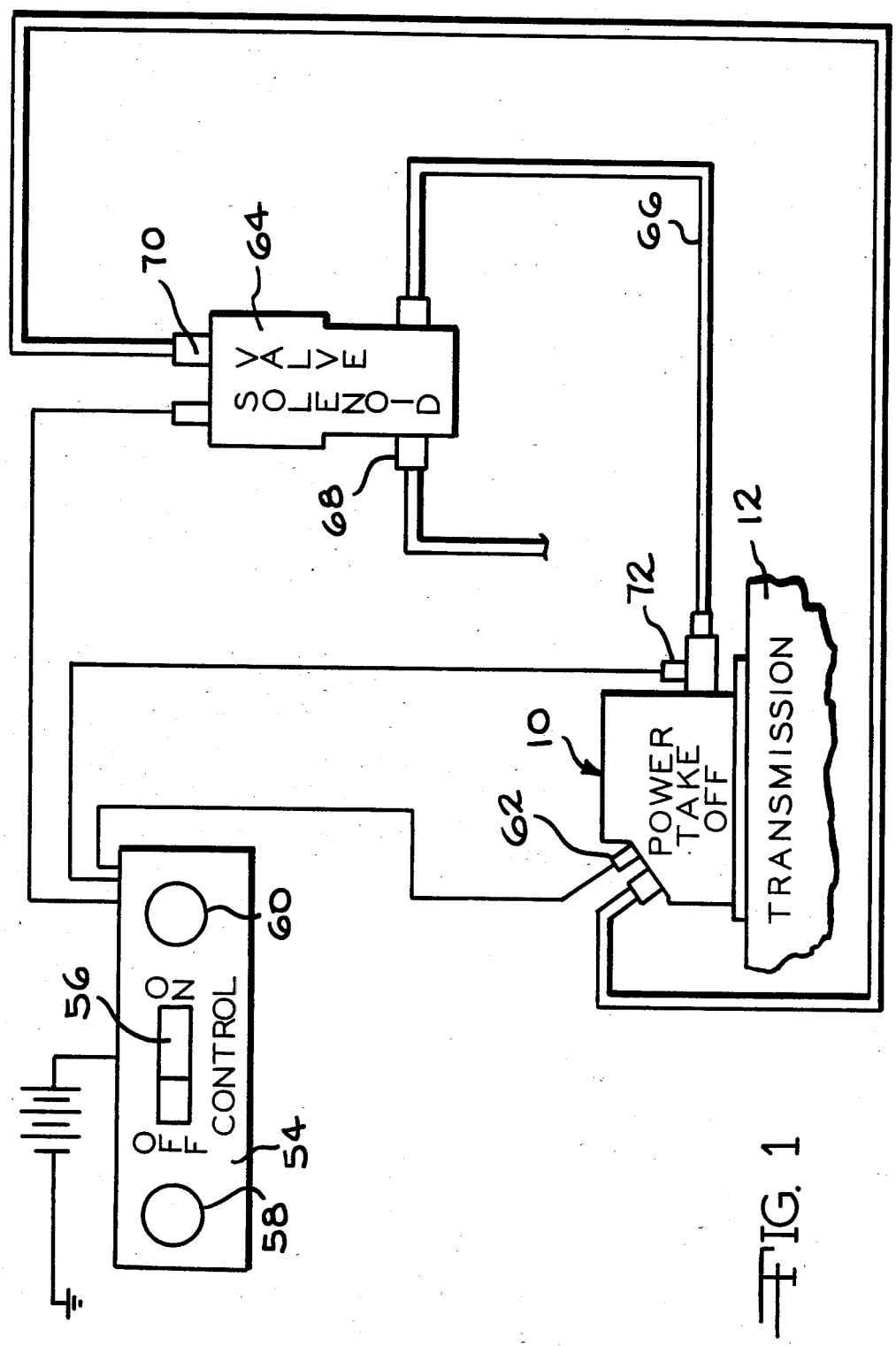
FIG. 1 is a schematic block diagram of the power takeoff speed control assembly of the present invention.

The present invention provides a central control unit 54 for controlling the operation of the power takeoff unit 10. Referring now to FIG. 1, the speed control system for the power takeoff unit 10 includes the central control unit 54 which can be mounted anywhere on the primary vehicle, preferably in the cab of the vehicle. The central control unit 54 includes a switch 56 for supplying power to the power takeoff unit 10. On the face of the central control unit 54 are an indicator light 58 which can tell the operator at a glance if the power takeoff unit 10 is operating and a second indicator light 60 which becomes lighted if the input gear 14 has reached an overspeed condition. The control circuitry contained within the central control unit 54 will be described shortly.

Figure 2:
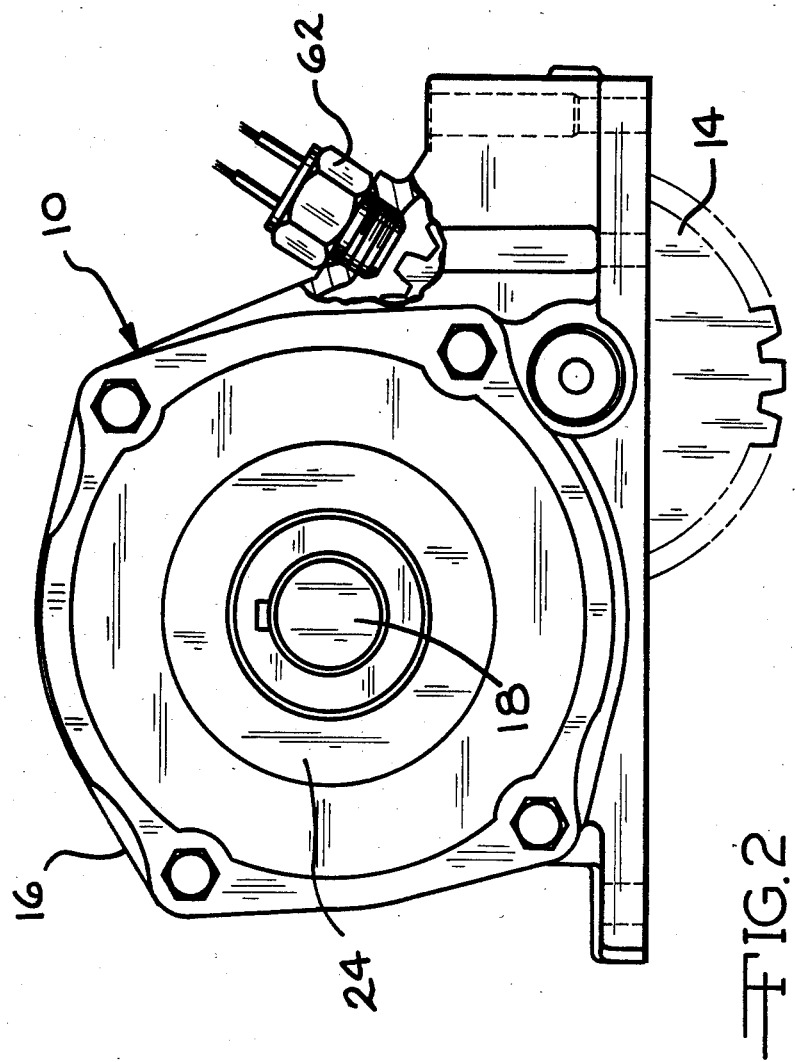
FIG. 2 is a partial cutaway view of a power takeoff unit showing the position of the speed sensor of the control unit of the present invention.

As shown in FIG. 2, a speed sensor assembly 62 is mounted on the power takeoff unit 10 proximate to the input gear 14. The speed sensor assembly 62 maintains surveillance of the speed of the input gear 14. The speed sensor assembly 62 is in communication with the central control unit 54 and sends continuous signals, indicative of the speed of the input gear 14, to the control unit 54.

Also in communication with the power takeoff unit 10 is a solenoid valve 64. The solenoid valve 64 is operatively engaged with the power takeoff unit 10 through fluid line 66. The fluid line 66 engages the power takeoff unit 10 at the orifice 44 as described earlier. The solenoid valve 64 directs fluid under pressure through line 66 to the power takeoff unit 10 to pressurize the clutch pack 20. The solenoid valve 64 also includes an intake port 68 for receipt of fluid under pressure from a reservoir (not shown) and an exhaust port 70 for returning fluid to the reservoir (not shown). As shown in the embodiment of FIG. 1, the preferred operating fluid is hydraulic fluid received from the transmission of the primary vehicle. Of course, an alternative to the use of hydraulic fluid would be pressurized air.

The solenoid valve 64 is in communication with the central control unit 54 and receives commands from the control unit 54; the commands being responsive to the signals being received from the speed sensor assembly 62, which constantly monitors the speed of the input gear 14 and signals such speeds to the central control unit 54. Should the input gear reach a speed which has been predetermined to be an undesirable overspeed condition, the central control unit 54 will, in response to the signals received from the sensor 62 command the solenoid valve 64 to release the pressure in fluid line 66 by dumping the fluid under pressure through its exhaust port 70. The output shaft 18 is thus disengaged as described earlier.

Also in communication with the power takeoff unit 10 is a pressure switch 72 which senses the pressure in line 66 and signals to the control unit 54 that the power takeoff unit is pressurized and in operation. The indicator light 58 will then become illuminated upon receipt of a signal from the pressure switch 72 that the power takeoff unit is in operation.

Figures 4, 4A:
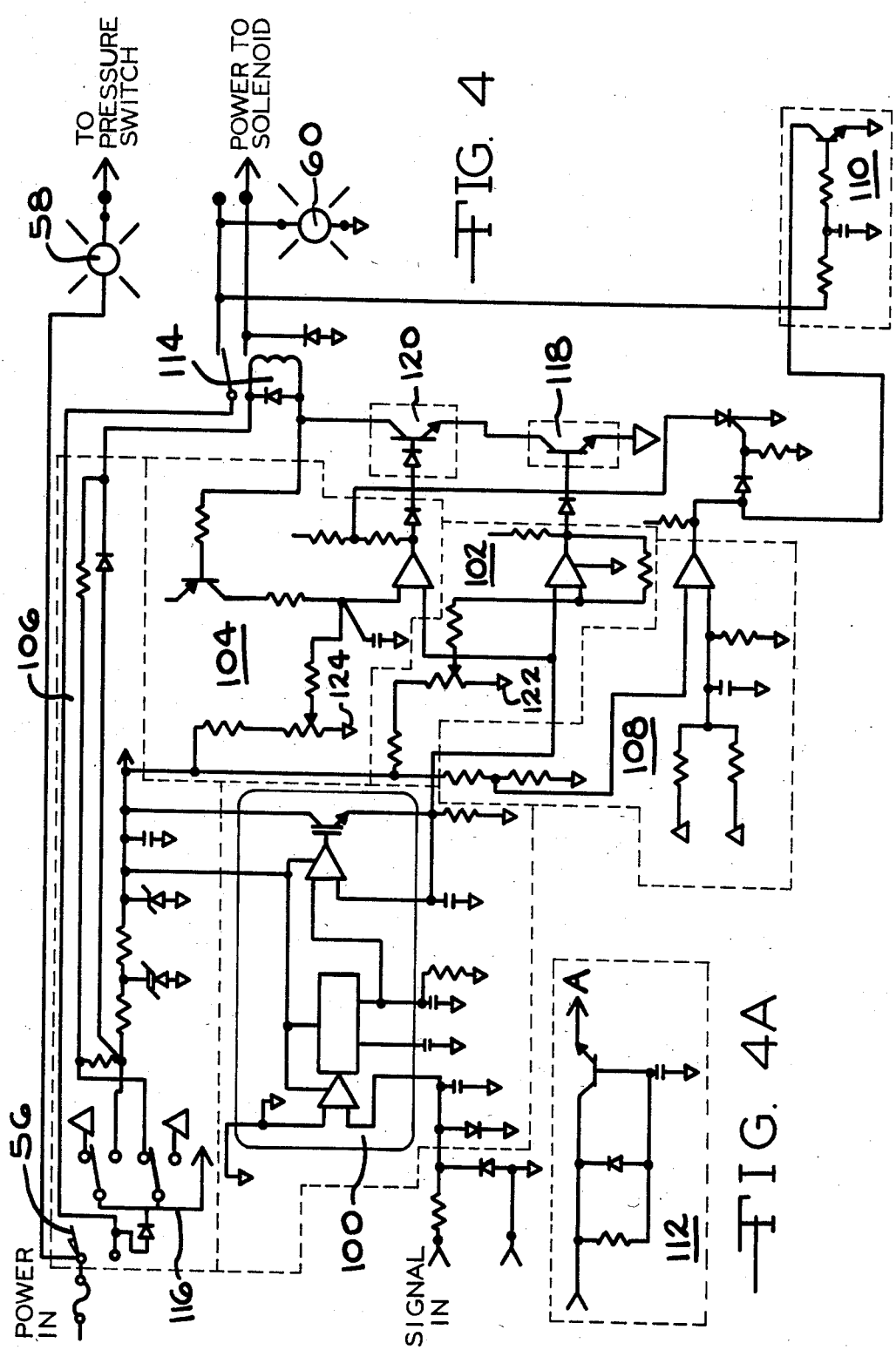
FIG. 4 is a circuit diagram of the control unit of the present invention.
FIG. 4A is a circuit diagram of a circuit to be inserted at "A" of the FIG. 4.

Referring now to FIG. 4 the circuitry contained within the central control unit 54 will be described. The circuitry of the central control unit 54 is comprised of a tach chip 100 which receives the signal from the speed sensor assembly 62; an adjustable overspeed comparator circuit 102 is in communication with tach chip 100; an adjustable reset comparator circuit 104 is also in communication with the tach chip 100; a voltage selection circuit 106 is in communication with the power switch 56 and, therefore, with the main power supply of the primary vehicle; a low voltage shut-down circuit 108 in communication with the voltage selection circuit 106; a start-up time delay low voltage shut-down circuit 110; and a start-up time overspeed check circuit 112. All of the various circuit components of the central control unit 54 are in communication with a relay switch 114 which delivers power to the solenoid valve 64.

The voltage selection circuit 106 is designed to receive power from the electrical system of the primary vehicle and supply that power to the speed control system of the present invention. The voltage selection circuit includes a voltage selection means 116 for selecting between power received from a 12-volt circuit and a 24-volt circuit.

The tach chip 100 receives input signals from the speed sensor 62 and translates the received signals into corresponding voltage levels. In operation, the tach chip 100 feeds the voltage level corresponding to the speed of the input gear 14 to the overspeed comparator circuit 102 which comprises the voltage level received from the speed sensor 62 with the overspeed cutout voltage level which has been pre-programmed into the circuit 102. The reset comparator circuit 104 concurrently receives voltage input from the tach chip 100, however, the reset comparator 104 is not operative unless the overspeed comparator circuit 102 has responded to the voltage input from the tach chip 100 by cutting the power supply to the solenoid valve 64. If the voltage received from the tach chip 100 is less than the pre-programmed overspeed cutout lvel, the overspeed comparator circuit 102 feeds the voltage of the driver 118 which in turn provides power through the relay switch 114 to the solenoid valve 64. If, however, the voltage received by the overspeed comparator circuit 102 is greater than the predetermined voltage level, the comparator circuit signals, through driver 118, the relay switch 114 to transmit power to the indicator light 60 which becomes lighted indicating an overspeed condition and eliminates power to the solenoid valve 64. The predetermined overspeed level is manually adjustable at the overspeed comparative circuit through overspeed adjusting means 122.

Once the power to the solenoid valve 64 has been discontinued because of an overspeed condition as determined by the overspeed comparator circuit 102, the reset comparator circuit 104 becomes activated and continues to analyze the voltage levels produced by the tach chip 100. The reset comparator circuit 104 is preprogrammed with a specific threshold voltage level which, if met, signals the relay switch 114 through a second driver 120 to again supply power to the solenoid valve 64. The voltage reset level is generally predetermined to be approximately representative of normal engine idle. Therefore, when the signal received from the speed sensor 62 by the tach chip 100 indicates an input gear 14 speed approximating engine idle, the reset comparator circuit 104 signals through driver 120 to the relay switch 114 to reinstate power to the solenoid 64. The preferred embodiment of this present invention also provides for a reset adjustment means 124 on the reset comparator circuit 104, thereby allowing the operator to manually establish the predetermined reset voltage level.

The low voltage shut-down circuit 108 maintains continuous surveillance over the voltage output of the voltage selection circuit 106. Should the voltage output of the voltage selection circuit 106 become less than a predetermined amount, the low voltage shut-down circuit 108 will act to cause the relay switch 114 to discontine the power supply to the solenoid valve 64, thereby disengaging the output shaft 18 from rotation.

Also included in the preferred embodiment of the present invention are a pair of start-up circuits which are utilized for approximately one second during the cold start of the present invention. The start-up time delay low voltage shut-down circuit 110 checks the voltage level supplied by the voltage selection circuit 106 upon immediate start-up of the system before allowing the relay switch 114 to supply power to the solenoid valve 64. The start-up time delay overspeed check circuit 112 likewise ensures, upon immediate start-up of the power takeoff unit that the input gear 14 is not starting in an overspeed condition. The start-up time delay overspeed check circuit 112 briefly interrupts the power supply to the solenoid valve 64 through the relay switch 114 until it has been determined that an overspeed condition does not exist. Both the start-up time delay low voltage shut-down circuit 110 and the start-up time delay overspeed check circuit 112 are operative only during the first few seconds of operation on cold start-up.

The power takeoff speed control system of the present invention operates as follows. With the engine of the primary vehicle operating, power is supplied to the power takeoff unit 10 by the switch 56 of the central control unit 54. The voltage input of either 12-volts or 24-volts has been preselected by the voltage selection circuit 106 to correspond with the voltage system of the primary vehicle. Activating the switch 56 on the central control unit 54 causes a first pulse of voltage to move through the circuitry of the central control unit 54. During this first pulse of voltage, the start-up time delay low voltage shut-down circuit 110 and the start-up time delay overspeed check circuit 112 operate to ensure that the voltage level within the central control unit circuitry is appropriate and that the input gear 14 is not already operating in an overspeed condition. Once the start-up circuits 110, 112 are satisfied that the voltage level is appropriate and the input gear 14 speed is acceptable voltage is supplied through relay switch 114 to the solenoid valve 64 to engage the power takeoff unit. The solenoid valve 64 directs fluid under pressure through the fluid line 66 into the power takeoff unit 10 to pressurize the pressure chamber 50, thereby forcing the piston 40 to engage the friction discs 34 and clutch plates 36, thereby engaging the inner clutch gear 32 with the output gear 28 and transmitting force to the output shaft 18 for rotation.

As the fluid under pressure flows into the power takeoff unit 10, the pressure switch 72 signals to the central control unit 54 that the power takeoff unit 10 is in operation and the indicator light 58 lights up.

The speed sensor assembly 62 maintains continuous surveillance over the speed of the input gear 14. As long as the speed of the input gear 14 is below the maximum allowable speed set by the adjustable overspeed comparator circuit 102, voltage continues to be supplied through the relay switch 114 to the solenoid valve 64. If, however, the speed of the input gear 14 becomes greater than the maximum speed setting at the adjustable overspeed comparator circuit 102, the relay switch 114 breaks the voltage supply to the solenoid valve 64 and lights up indicator light 60 to indicate an overspeed condition. Of course, disengagement of power to the solenoid valve 64 will act to disengage the output shaft 18 of the power takeoff unit 10 as described earlier. Once the power to the solenoid valve 64 has been eliminated because of an overspeed condition, the voltage levels are monitored by the reset comparator circuit 104. When the speed of the input gear 14 has reduced down to a level acceptable to the reset comparator circuit 104 the relay switch 114 will supply power once again to the solenoid valve 64. Thus, the speed control system of the present invention not only disengages the power takeoff unit but also automatically re-engages the power takeoff unit.

The foregoing description of the preferred embodiment is solely for purposes of illustration and is not intended to be limiting upon the scope and content of the following claims.

We claim:

1. A power takeoff assembly comprising, in combination, a power takeoff unit having an input gear and an output shaft, said power takeoff unit being shiftable between an engaged position wherein said output shaft is rotationally driven by said input gear and a disengaged position wherein said output shaft does not rotate;

a speed sensor means adjacent said power takeoff unit for sensing the rotational speed of said input gear;

a valve means in communication with said power takeoff unit for shifting said unit between such engaged and disengaged positions;

a control means in communication with said sensor means and said valve means, said control means including at least one electronic comparator circuit having preset operating parameters for said input gear, said circuit receiving signals from said sensor means and, directing said valve means to disengage said power takeoff unit when the operating condition of said input gear falls outside said preset operating parameters.

2. The power takeoff assembly of claim 1 wherein such operating parameters include a first speed setting and a second speed setting and said valve means operates to disengage said output shaft when the speed of said input gear exceeds such first speed setting.

3. The power takeoff assembly of claim 2 wherein said valve means operates to engage said output shaft when the speed of said input gear is less than such second speed setting.

4. The power takeoff assembly of claim 3 wherein said second speed setting is lower than said first speed setting.

5. The power takeoff assembly of claim 4 wherein said first and second speed settings are manually adjustable at said control means.

6. The power takeoff assembly of claim 1 wherein said power takeoff unit includes a clutch means having at least one clutch plate in communication with said output shaft or said input gear and at least one friction plate in communication with said input gear or said output shaft, said friction plate engaging said clutch plate to transfer force from said input gear to said output shaft when said power takeoff unit is engaged.

7. The power takeoff assembly of claim 6 wherein said valve means operates to transfer fluid under pressure to said clutch means to actuate such engagement between said clutch plate and said friction plate.

8. The power takeoff assembly of claim 7 wherein said fluid is air.

9. The power takeoff assembly of claim 7 wherein said fluid comprises hydraulic fluid.

10. The power takeoff assembly of claim 4 wherein said control means includes a time delay means, said time delay means operating during initial start-up of said power takeoff unit to disengage said output shaft for a predetermined period of time.

11. The power takeoff assembly of claim 10 wherein said time delay means includes an overspeed check circuit, said overspeed check circuit disengaging said output shaft during initial start-up until said speed sensor signals that the speed of said input gear is not in excess of such first speed setting.

12. The power takeoff assembly of claim 10 wherein said time delay means includes a low voltage shut-down circuit, disengaging said output shaft during initial start-up if the voltage level received by said control means is less than a predetermined minimum.

13. The power takeoff assembly of claim 4 wherein said control means includes a second low voltage shut-down circuit, said second low voltage shut-down circuit disengaging said output shaft anytime during operation of said power takeoff unit if the voltage level received by said control means is less than a predetermined minimum.

14. The power takeoff assembly of claim 4 further including switch means adjacent said power takeoff unit for determining whether said output shaft is engaged.

15. The power takeoff assembly of claim 14, wherein said control means includes an indicator light means in communication with said switch means, said indicator light means being lighted when said output shaft is engaged.

16. The power takeoff assembly of claim 4 further including a second indicator light located on said control means for indicating an overspeed condition of said input gear.

17. The power takeoff assembly of claim 4 wherein said control means further includes a central control unit positioned proximate the location the operator of said power takeoff unit is positioned during operation of said power takeoff unit, said central control unit containing said electronic comparator circuits.

18. The power takeoff assembly of claim 17 wherein said central control unit includes a switch means for determining whether said output shaft is engaged, a first indicator light engaged with said switch means for indicating the engagement of said output shaft, and a second indicator light for indicating an overspeed condition of said input gear.

* * * * *